United States Patent [19]

Schauer et al.

[11] Patent Number: 4,927,365
[45] Date of Patent: May 22, 1990

[54] APPARATUS FOR PROVIDING AN ELECTRICAL CONDUCTION PATH BETWEEN TWO CONTACT LOCATIONS WHICH ARE ROTATABLE WITH RESPECT TO EACH OTHER

[75] Inventors: Friedrich Schauer, Heroldsberg; Manfred Wolff, Schwarzenbruch, both of Fed. Rep. of Germany

[73] Assignee: Kabelmetal Electro GmbH, Hanover, Fed. Rep. of Germany

[21] Appl. No.: 430,321

[22] Filed: Nov. 2, 1989

[30] Foreign Application Priority Data

Nov. 10, 1988 [DE] Fed. Rep. of Germany ....... 3838114

[51] Int. Cl.$^5$ ........................................... H01R 39/00
[52] U.S. Cl. ...................................... 439/15; 439/164
[58] Field of Search ................................. 439/11–15, 439/492–499, 445, 164; 280/731

[56] References Cited

U.S. PATENT DOCUMENTS

| 4,540,223 | 9/1985 | Schmerda et al. | 439/15 |
| 4,696,523 | 9/1987 | Schauer et al. | 439/15 |
| 4,824,396 | 4/1989 | Sasaki et al. | 439/15 |
| 4,836,795 | 6/1989 | Schauer | 439/15 |
| 4,838,803 | 6/1989 | Kondo | 439/15 |

FOREIGN PATENT DOCUMENTS 2164506 3/1986 United Kingdom ................. 439/13

Primary Examiner—David Pirlot
Attorney, Agent, or Firm—James C. Jangarathis

[57] ABSTRACT

Apparatus is described for providing an electrical conduction path between two contact locations rotatable one with respect to the other. A flat ribbon cable having at least two electrical conductors and being wound in the manner of a spring, is firmly attached at its respective ends to the contact locations. To protect the flat ribbon cable from kinking and mechanical damage at each of such ends, each end portion thereof is folded across an immediately adjacent portion and a stabilizer connection assembly is positioned to extend about both such portions. Each such assembly is comprised of a protective sheath of flexible insulating material positioned closely about the folded end portion; an angular attachment of molded insulating material, including a clamping segment and a ribbon-shaped, sheath segment extending at an angle one to the other; and a means for locking the clamping segment in a compressed condition.

9 Claims, 3 Drawing Sheets

APPARATUS FOR PROVIDING AN ELECTRICAL CONDUCTION PATH BETWEEN TWO CONTACT LOCATIONS WHICH ARE ROTATABLE WITH RESPECT TO EACH OTHER

The invention relates to an apparatus for maintaining an electrical conduction path between two contact locations rotatable with respect to each other; and, more particularly, to such an apparatus comprising a flat ribbon cable wound as a coiled spring, and having its ends firmly attached to such contact locations.

BACKGROUND OF THE INVENTION

It is priorly known to provide a conduction path between two contact locations of which one is movable on a circular path, while the other is disposed stationary outside such circular path. Apparatus having such conductor paths include, for instance, cable coilers in which the electric cable or cord is wound on a reel. The cord can be pulled out of the housing of the apparatus. Under the action of a spring it is automatically rolled up again after a pulling force is removed. One essential problem here is the transfer of current from the firm attachment of the apparatus to the end of the line which is arranged turnably on the spool. This problem occurs in apparatus in which there are two contact locations which are movable relative to each other and one of which in most cases is developed as a fixed point. In addition to the above-mentioned cable winder, such an apparatus may also be an anti-rebound device for automotive vehicles in which the electric current feed is arranged in the steering wheel of an automobile.

For the transfer of current between contact locations which move relative to each other, wiper contacts or rings are priorly known. Such arrangements are subject to wear and are disadvantageous particularly in the case of low current intensities because of the higher transfer resistances.

U.S. Pat. No. 4,696,523, issued Sept. 29, 1987, is directed to a priorly known apparatus including a conductive path between two contact locations which are rotatable with respect to each other. In this apparatus, the conduction path is comprised of a flat ribbon cable wound in the manner of a coiled spring. Upon the rotation of one of the contact locations in one direction, the windings of such coiled spring are pulled together to reduce the diameter of the coiled spring, while rotation in the opposite direction causes the windings of such coil springs to expand and increase the diameter of the coiled spring. Accordingly, the relative movement of the two contact locations connected by such coiled spring results in a "breathing motion", similar to a watch spring. To protect against the considerable mechanical stress and kinking of the end portions of the flat ribbon cable firmly attached to the corresponding contact locations, such prior art apparatus includes strip-shaped stabilizers at each of the connections between the flat ribbon cable and the contact locations, each of such stabilizers being of dimensionally stable plastic and having a U-shaped cross section for closely enclosing the associated end portion of the flat ribbon cable.

U.S. Pat. No. 4,836,795, issued June 6, 1989, is directed to a priorly known apparatus for providing an electrical conduction path between a first contact location rotatable a plurality of rotations, in either direction, about a longitudinal axis, and a stationary contact location positioned radially from the rotatable contact location. Such apparatus is comprised of a bifilar spiral spring formed of a length of flat ribbon cable having at least two electrical conductors. The bifilar spiral coil spring is secured only by firmly attached connections at its opposite ends to the two contact locations; whereby it uncoils and slidably moves in response to the direction of rotation of the rotatable contact location, and upon reversal of such rotation, recovers its original shape and position between the two contact locations.

OBJECTS OF THE INVENTION

An object of the present invention to provide a novel apparatus for maintaining a conductive path between two contact locations rotatable with respect to each, such conductive path comprising a flat ribbon cable the ends of which are firmly attached to the respective contact locations.

Another object of the present invention is to provide such a novel apparatus in which the end portions of the flat ribbon cable in the vicinity of the respective contact locations are protected against mechanical damage and kinking.

SUMMARY OF THE INVENTION

These and other objects of the present invention are achieved by an apparatus comprising an electrical conductive path between two contact locations rotatable, one with respect to the other. The electrical conduction path comprises a flat ribbon cable, including at least two electrical conductors, that is wound in the manner of a coiled spring. The flat ribbon cable is firmly attached at a first end thereof to one of the contact locations, while the other end thereof is firmly attached to the other contact location. To protect the flat ribbon cable from kinking and mechanical damage at each of the ends thereof, each end portion thereof is folded across an immediately adjacent portion and a stabilizer connection assembly is positioned to extend across both such portions. Each of such assemble is comprised of a protective sheath of flexible insulating material positioned closely about the folded end portion, and an angular attachment of molded insulating material, including a clamping segment and a ribbon-shaped segment extending at an angle one to the other.

BRIEF DESCRIPTION OF THE DRAWINGS

A better understanding of the present invention as well as the objects and advantages thereof will become apparent upon consideration of the following disclosure thereof, especially when taken with the accompanying drawings, wherein:

Referring to FIG. 1, there is depicted two circular walls 1 and 2 of a housing of an electric apparatus. This apparatus may function as a control apparatus for anti-rebound protection when installed in the steering shaft of an automobile. In order to provide an electric signal to an electronic system 3 of this apparatus, the apparatus is connected to a battery 4. The battery 4 is connected via an electric cable 5 to a fixed contact location 6. The electronic system 3 is connected by an electric line 7 to a contact location 8 which is rotatable in the direction indicated by a double-ended arrow 9. Between the two contact locations 6 and 8 there is a coiled spring formed of a length of flat ribbon cable 10 of a priorly known type positioned about the rotatable contact location 8. Upon rotation of the rotatable contact location 8 in one direction, the windings of the flat ribbon cable 10 are pulled together to reduce the diameter of the coiled spring; while the rotation in the opposite direction causes the windings of the coiled spring to expand and increase in diameter. Accordingly, the relative movement between the two contact locations 6 and 8 connected by the flat ribbon cable 10 results in a "breathing motion". Although the number of revolutions of a steering wheel of an automobile is limited to about six revolutions, the length of the flat ribbon cable 10 is such as to provide substantially more than six windings between the contact locations 6 and 8. Thus, a single revolution of the contact location 8 is not substantially perceptible. At each contact locations 6 and 8, each end of the flat ribbon cable 10 is connected by means of a stabilizer connection assembly 16. Each assembly 16 features of which are described hereafter with respect to FIGS. 4 through 9, is fastened to the corresponding contact locations 6 or 8, for example, by welding or bonding, or by a clamp or snap engagement.

Referring to FIG. 2, there is depicted an apparatus for maintaining a conduction path between a contact location 8' rotatable about the longitudinal axis of a steering column of an automobile, and a fixed contact location 6' radially positioned from the rotatable contact location 8'. Such apparatus includes a bifilar spiral coil spring 12' formed of a length of flat ribbon cable 10', including two electrical conductors. In particular, the flat ribbon cable 10' is configured so as to have one portion thereof bent over, at a reversing location 13', onto the remaining portion thereof, and thereafter being formed as the bifilar spiral coil spring 12' with the reversing location 13' as its center. Each of the ends of the flat ribbon cable 10' is connected to one of the contact locations 6' or 8' by means of a stabilizer connection assembly 16 of the same type referred to above with respect to FIG. 1. Each of the two portions of the flat ribbon cable 10' divided at the reversing location 13' is of a length sufficiently greater than the distance between the stationary contact location 6' and the rotatable contact location 8' such that the bifilar spiral coil spring 12' has a diameter in its original shape and position at most identical with the shortest distance between the contact locations 6' and 8', and only partially uncoils upon a plurality of rotations of the contact location 8'. The bifilar spiral coil spring 12' is secured only by the connections at its opposite ends to the two contact locations 6' and 8', whereby it uncoils and slidably moves in response to the direction of rotation of the rotatable contact location 8', and upon reversal of such rotation, recovers its original shape and position between the two contact locations 6' and 8'.

Figure 1:
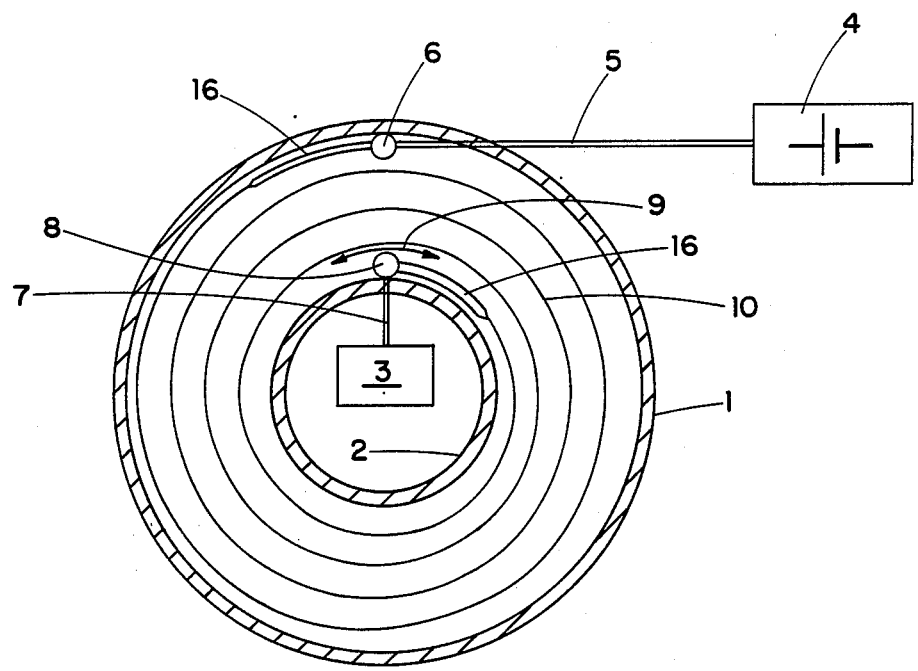
FIG. 1 is a schematic view of a first apparatus in accordance with the invention for maintaining an electrical conduction path between two contact locations one of which is rotatable with respect to the other, the conduction path comprising a length of flat ribbon cable formed as a coiled spring having its turns lying concentric to each other.
Figure 2:
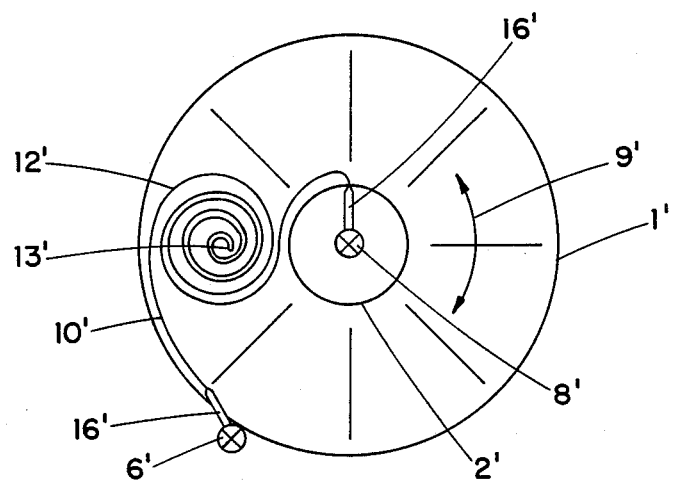
FIG. 2 is a schematic view of a second apparatus in accordance with the invention for maintaining an electrical conduction path between two contact locations one of which is rotatable with respect to the other, such conduction path comprising a length of flat ribbon cable formed as a bifilar spiral coil spring.

As the stabilizer connection assembly 16 employed in the apparatus of FIG. 1, and the stabilizer connection assembly 16' employed in the apparatus of FIG. 2 are identical as to structure and purpose, only one such assemblies shall be described hereafter.

Figure 3:
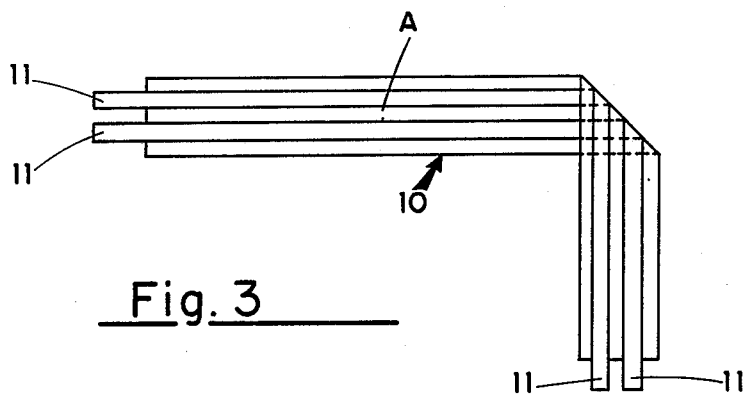
FIG. 3 is a plan view of a length of flat ribbon cable of a priorly known type employed in the apparatus of FIGS. 1 and 2, including two electrical conductors, such cable having an end portion folded across the immediately adjacent portion to form a connecting end of the cable.

FIG. 3 illustrates the manner in which an end portion A of the flat ribbon cable 10 is folded across an immediately adjacent portion of the cable 10 to form a change in the longitudinal direction of the cable 10 of approximately 90 degrees. In the apparatus of FIG. 1 or 2 each end of the flat ribbon cable 10 or 10' is so formed. Also, a pair of electrical conductors 11 extending longitudinally within the flat ribbon cable 10 or 10' have preferably flat cross-sections for enabling a cable cross-section that is very flat. The ends of the electrical conductor 11 extending from the end portion A are electrically connected, for example, by plug connectors (not shown) at the contact locations 6 and 8, or 6' and 8'.

Figure 4:
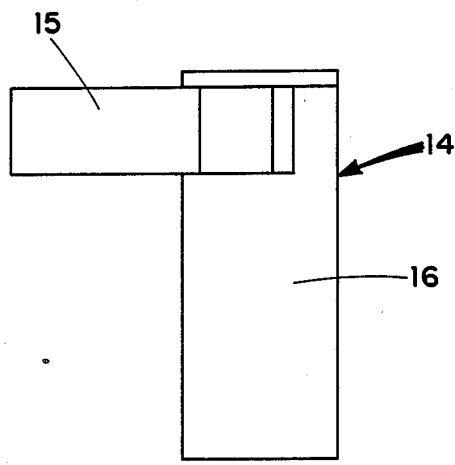
FIG. 4 is a plan view of a sheath and clamping component of a stabilizer connection assembly of the type employed in the apparatus of FIGS. 1 and 2.
Figure 5:
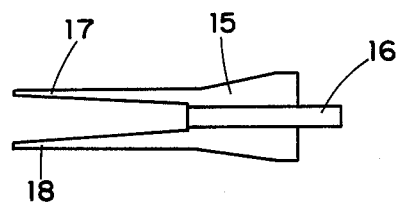
FIG. 5 is an elevation view of the sheath and clamping component of FIG. 4.
Figure 7:
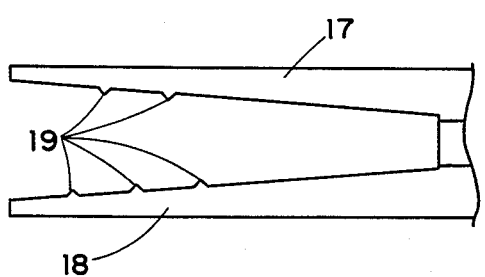
FIG. 7 is an enlarged, partial elevation view of the sheath and clamping component of FIGS. 4 and 5.
Figure 8:
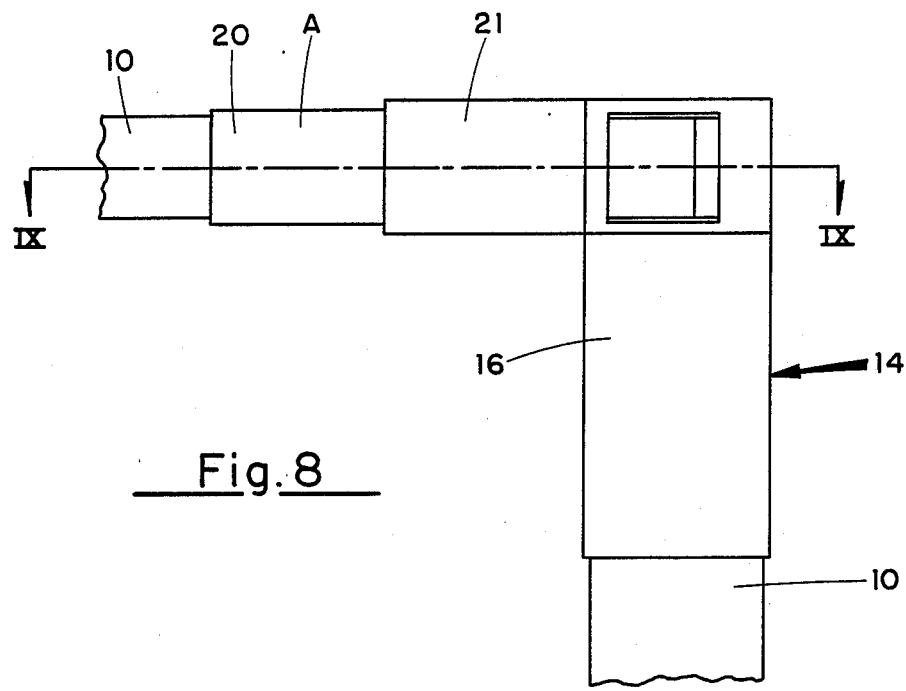
FIG. 8 is a plan view of the stabilizer connection assembly of the type employed in the apparatus of FIGS. 1 and 2, formed about a portion of a flat ribbon cable folded as depicted in FIG. 3.

FIG. 4 illustrates a first component of the stabilizer connection assembly 16 comprised of an angular attachment 14 formed as a unitary molded part of insulating material, such attachment comprising a clamping segment 15 and a ribbon-shaped, sheath segment 26 extending longitudinally at approximately a right angle one to the other. As illustrated in FIG. 8, the mounted position of the angular attachment 14 upon one end of the flat ribbon cable 10 includes the positioning of the ribbon-shaped, sheath segment 26 about the portion of the flat ribbon cable 10 which is immediately adjacent to the folded end portion A, and the clamping segment 15 extends in alignment with, and on opposite sides of, the folded end portion A. The ribbon-shaped, sheath segment 26 is dimensioned to closely surround the cable 10, is long in proportion to its width, and is bent to approximate the radius of curvature of the flat ribbon cable 10. FIGS. 5 and 7 depict the clamping segment 15 as comprising a pair of flexible clamping arms 17 and 18, the interior opposite surfaces of which include a plurality of gripping protrusions 19.

Figure 9:
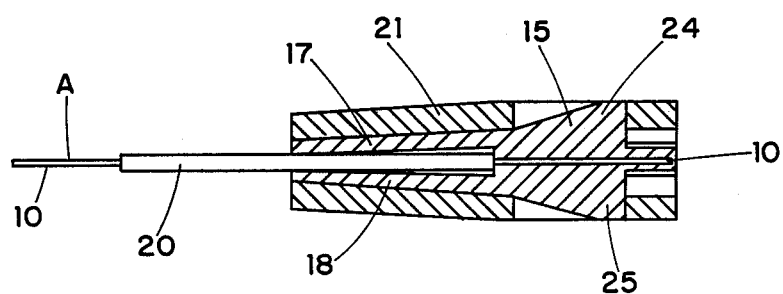
FIG. 9 is a sectional view of the assemblage depicted in FIG. 8, as viewed along line IX—IX.

With regard to FIG. 9, a second component of the stabilizer connection assembly 16 comprises a protective sheath 20 of flexible insulating material, for example, polyvinyl chloride, dimensioned to closely fit about the end portion A of the flat ribbon cable 10, between the interior surfaces of the clamping arms 17 and 18 for providing mechanical protection for the portion of cable extending therethrough.

Figure 6:
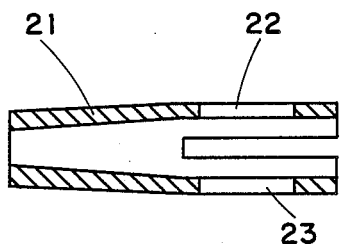
FIG. 6 is a sectional view of a locking sleeve mountable about a portion of the sheath and clamping component of FIGS. 4 and 5.

FIG. 6 depicts a third component of the stabilizer connection assembly 16, identified as a lock housing 21. The lock housing 21 is configured as a rigid tubular structure that is dimensioned for slidably positioning same about the clamping arms 17 and 18 when such latter elements are pressed toward each other. The lock housing 21 is retained about the clamping arms 17 and 18 by means of the engagement of surfaces surrounding a pair of apertures 22 and 23 (FIG. 6) in the housing 21, and a pair of protrusions 24 and 25 of the clamping segment 15 that fit into the apertures 22 and 23. As an alternative to the lock housing 21, the third component of the stabilizer connection assembly 16 may be provided by injection molding a plastic sleeve about the compressed clamping arms 17 and 18, such arms being retained in such compressed condition until the injection molded sleeve is sufficiently solidified.

While the invention has been described in connection with exemplary embodiments thereof, it will be understood that many modifications will be apparent to those of ordinary skill in the art, and that this application is intended to cover any adaptions or variations thereof. Therefore, it is manifestly intended that the invention be only limited by the claims and equivalents thereof.

What is claimed:

1. In an apparatus for providing an electrical conduction path between a first contact location and a second contact location rotatable one with respect to the other, said electrical conduction path comprising a flat ribbon cable having at least two electrical conductors and being wound in the manner of a coiled spring, said flat ribbon cable being firmly attached at a first end thereof to said first contact location, and firmly attached at a second end thereof to said second contact location, the improvement comprising an end portion of said flat ribbon cable at said first end being folded across an immediately adjacent portion of said flat ribbon cable to form a change in the longitudinal direction of said flat ribbon cable, said folded portion of said flat ribbon cable having a stabilizer connection assembly positioned thereabout, said assembly including:

an angular attachment of molded insulating material, said attachment having a clamping segment and a ribbon-shaped, sheath segment extending at an angle one to the other, said clamping segment including a pair of clamping arms between which said folded end portion of said flat ribbon cable is positioned, and said sheath segment being positioned closely about a portion of the said flat ribbon cable immediately adjacent to said folded end portion;

a protective sheath of flexible insulating material positioned closely about a portion of said folded end portion of said flat ribbon cable, between said clamping arms; and means for locking said clamping arms in a compressed condition.

2. An apparatus in accordance with claim 1, wherein said ribbon-shaped, sheath segment and said clamping segment are formed as a unitary molded part, and form an angle one to the other of about 90 degrees.

3. An apparatus in accordance with claim 1, wherein said ribbon-shaped, sheath segment has a curvature approximating that of said flat ribbon cable.

4. An apparatus in accordance with claim 1, wherein said clamping arms include interior opposite surfaces that have a plurality of protrusions extending therefrom.

5. An apparatus in accordance with claim 1, wherein each of said pair of clamping arms is flexible.

6. An apparatus in accordance with claim 1, wherein said protective sheath has a hollow tubular configuration the inner dimension of which approximates the cross-section of said flat ribbon cable.

7. An apparatus in accordance with claim 1, wherein said locking means includes a plastic sleeve injection molded about said clamping arms compressed into engagement with said protective sheath.

8. An apparatus in accordance with claim 1, wherein said locking means comprises a rigid tubular structure that is dimensioned to be slidably positioning about said clamping arms when the latter are compressed into engagement with said protective sheath.

9. An apparatus in accordance with claim 2, wherein said rigid tubular structure includes a pair of apertures, and said clamping segment includes a pair of protrusions that fit into said apertures when said rigid tubular structure is slidably positioned about said clamping segment.

* * * * *